(12) United States Patent
Washington

(10) Patent No.: US 6,553,725 B2
(45) Date of Patent: Apr. 29, 2003

(54) LIGHTWEIGHT, PORTABLE AND COLLAPSIBLE HUNTER'S BLIND AND METHODS OF MAKING THE SAME

(76) Inventor: Scott Washington, 27 Timberly La., Lake Charles, LA (US) 70605

(*) Notice: Subject to any disclaimer, the term of this patent is extended or adjusted under 35 U.S.C. 154(b) by 0 days.

(21) Appl. No.: 09/888,150

(22) Filed: Jun. 22, 2001

(65) Prior Publication Data

US 2002/0026742 A1 Mar. 7, 2002

Related U.S. Application Data

(60) Provisional application No. 60/214,132, filed on Jun. 26, 2000.

(51) Int. Cl.[7] ............................................. A01M 31/02
(52) U.S. Cl. .................. 52/64; 52/70; 52/71; 135/901; 43/1; 446/478; 446/488
(58) Field of Search ........................ 52/64, 70, 71, 52/79.5; 135/901, 87; 43/1; 446/478, 488

(56) References Cited

U.S. PATENT DOCUMENTS

| | | | | |
|---|---|---|---|---|
| 1,918,375 A | * | 7/1933 | Bowersock et al. | 52/71 |
| 2,652,845 A | * | 9/1953 | O'Neill et al. | 135/87 X |
| 2,963,122 A | * | 12/1960 | Jagemann | 52/66 |
| 3,018,857 A | * | 1/1962 | Parham | 52/63 |
| 3,498,587 A | * | 3/1970 | Friedberg | 52/71 |
| 3,709,237 A | * | 1/1973 | Smith | 135/87 |
| 3,913,598 A | * | 10/1975 | Glutting, Jr. et al. | 135/152 |
| 4,035,964 A | * | 7/1977 | Robinson | 52/66 |
| 4,123,869 A | | 11/1978 | Witt | |
| 4,467,572 A | * | 8/1984 | Somers et al. | 52/70 |
| 4,506,467 A | | 3/1985 | Strung | |
| 4,798,019 A | | 1/1989 | Sury et al. | |
| 4,964,249 A | * | 10/1990 | Payne | 52/70 |
| 5,172,525 A | * | 12/1992 | Cook | 52/71 |
| 5,241,772 A | | 9/1993 | Hall | |
| 5,592,960 A | | 1/1997 | Williams | |
| 5,813,160 A | * | 9/1998 | Thoelke | 43/1 |
| 6,012,253 A | * | 1/2000 | Burns | 52/79.5 |
| 6,021,794 A | * | 2/2000 | Guerra | 135/87 X |
| 6,065,253 A | * | 5/2000 | Ojeda | 52/79.9 |

FOREIGN PATENT DOCUMENTS

| | | | | |
|---|---|---|---|---|
| GB | 640518 | * | 7/1950 | 52/71 |
| JP | 2-272126 A | * | 11/1990 | 52/71 |

* cited by examiner

Primary Examiner—Carl D. Friedman
Assistant Examiner—Brian E. Glessner
(74) Attorney, Agent, or Firm—Richard L. Marsh

(57) ABSTRACT

A blind for use by hunters, bird watchers, field observers and the like has at least three upstanding walls, a top cover and a bottom pan where at least one of the walls has an opening for ingress and egress and at least one of the walls has an openable and closeable window.

10 Claims, 3 Drawing Sheets

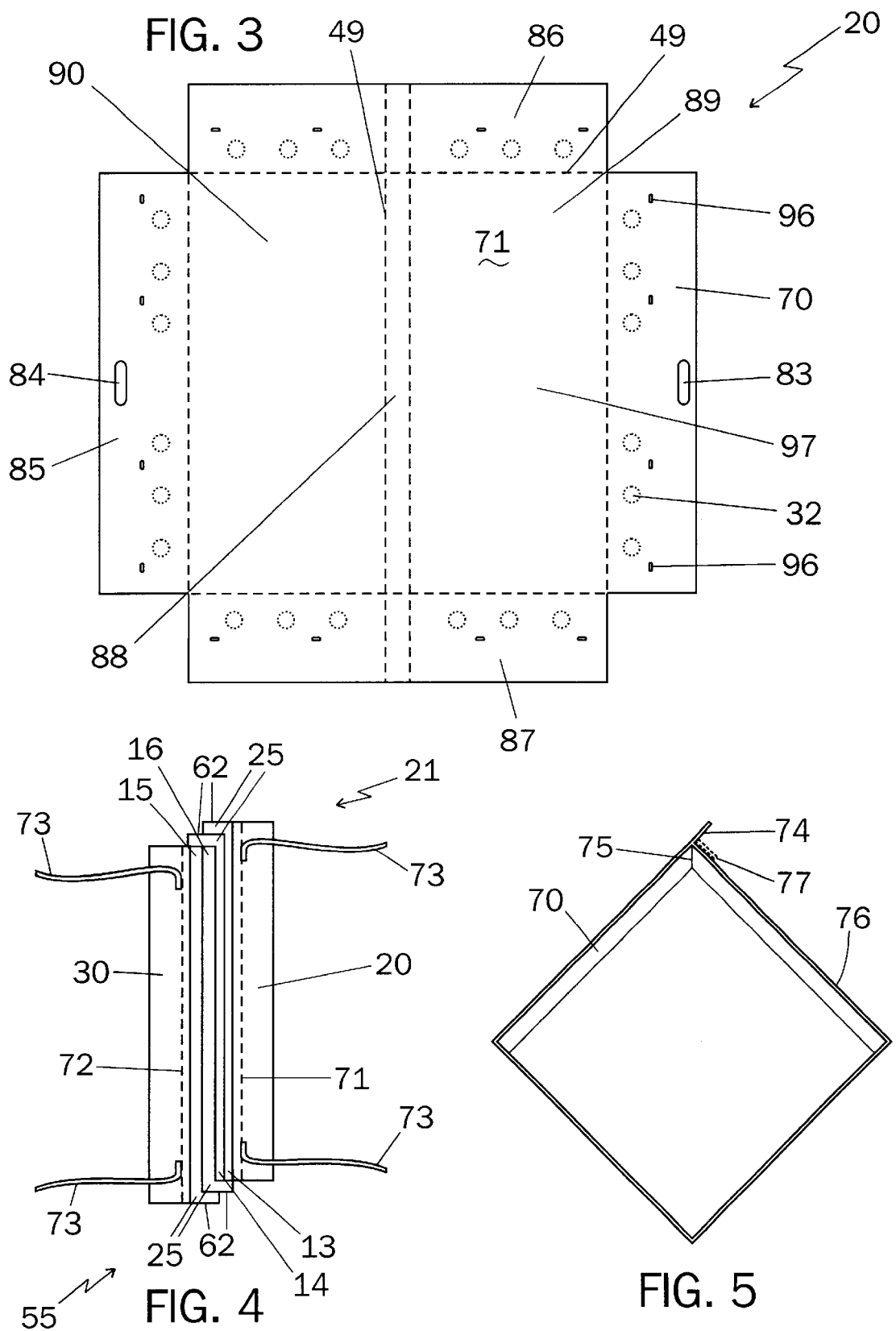

LIGHTWEIGHT, PORTABLE AND COLLAPSIBLE HUNTER'S BLIND AND METHODS OF MAKING THE SAME

RELATED APPLICATION DATA

This application is a non-provisional application of Applicant's provisional application Ser. No. 60/214,132 filed on Jun. 26, 2000.

BACKGROUND OF THE INVENTION

1. Field of the Invention

This invention relates to a lightweight, collapsible, portable enclosure for a hunter awaiting hunted animals to approach wherein the hunter and enclosure are preferably camouflaged.

2. Prior Art Statement

It is known to provide a multi-tier hunter's blind constructed of box-like elements made from double-walled cardboard wherein each box-like structure has four walls and a at least a partial top. The box-like elements are covered with a material resembling straw to simulate a stack of straw bales, each box-like element capable of being broken down into smaller elements by releasing fastening elements. For instance, see the U.S. Pat. No. 4,123,869 issued on Nov. 7, 1978 to Gordon Witt.

It is also known to a portable blind simulative of the associated adjacent environment comprising an enclosure having a peripheral wall and means on the outer surface of the wall to reflect the adjacent environment. The peripheral wall comprises separate panels joined together at the edges thereof to form a circular blind. For instance, see the U.S. Pat. No. 4,506,467 issued on Mar. 26, 1985 to Norman Strung.

It is further known to provide a portable blind comprising a frame and fabric cover fixable on the frame, the cover affixed to the frame with Velcro straps. The cover is semi-rigid which is also used to store and transport the frame when the blind is broken down. For instance, see the U.S. Pat. No. 4,798,019 issued on Jan. 17, 1989 to Sury, et al.

Yet still known in the art is a cylindrical blind having a top and bottom and circular side walls formed of elongate rectangular arcuate panels joined together along adjacent longitudinal side edges. The panels simulate the bark of a tree. For instance, see the U.S. Pat. No. 5,241,772 issued on Sep. 7, 1993 to Rocky A. Hall.

Finally, it is known to provide a portable hunting blind comprising panels of rigid, substantially inflexible construction having a flat mirrored reflective outer surface the blind having a flexible camouflaged top cover. For instance, see the U.S. Pat. No. 5,592,960 issued on Jan. 14, 1997 to Christopher R. Williams.

SUMMARY OF THE INVENTION

Though the hunter's blinds available in the art are suitable for hunting, some are difficult to transport while others are difficult to erect. Thus there exists a need for a hunter's blind constructed of foam board, double walled plastic, corrugated thermoplastic, corrugated card board or card board panels wherein the panels are secured together at the side edges thereof in a rectilinear form with a top, an entry and at least one openable "window" for use by hunters in the field.

Therefore, it is an object of this invention to provide a hunter's blind comprising upstanding walls, a top cover, a bottom pan and means for ingress and egress.

It is also an object of this invention to provide a hunter's blind comprising upstanding walls, a top cover, a bottom pan and means for ingress and egress wherein the means for ingress & egress is integral with at least one wall and comprises an openable flap larger than an opening in the at least one wall.

Yet another object of this invention is to provide a hunter's blind comprising rectilinear walls, a top cover, a bottom pan and means for ingress and egress wherein the means for ingress & egress is disposed in the front wall of the hunter's blind.

Still another object of this invention is to provide a hunter's blind comprising walls having means for observing disposed through at least one wall.

A further object of this invention is to provide a hunter's blind comprising rectilinear walls, a top cover, a bottom pan wherein the top cover and the bottom pan are separately detachably affixed to the rectilinear walls.

A significant object of this invention is to provide a hunter's blind comprising upstanding walls, a top cover, a bottom pan wherein the top cover and bottom pan are separated from the upstanding walls, at least one upstanding wall is separated from an adjacent upstanding wall at the contiguous corner thereof, the upstanding walls are folded upon each other to provide a substantially flat fan folded configuration of the hunter's blind for transporting or storage.

An important object of this invention is to provide a hunter's blind comprising walls, a top cover, a bottom pan wherein the top cover and bottom pan are separated from the walls, at least one wall is separated from an adjacent wall at the contiguous corner thereof, the walls are folded upon each other to provide a substantially flat fan folded configuration of the hunter's blind for transporting or storage wherein the top cover and the bottom pan have means for being secured together on opposite sides thereof and around the flat fan folded configuration and wherein at least the top cover or bottom pan has means for grasping disposed thereon.

Still another object of this invention is to provide a removable top cover for a hunter's blind wherein the removable top cover is folded in half and has hand holds formed in at least one side flange thereof Yet another significant object of this invention is to provide a hunter's blind comprising walls, a removable top cover, a removable bottom pan wherein the top cover and bottom pan are separated from the walls, at least one wall is separated from an adjacent wall at the contiguous corner thereof, the walls are folded in half and additionally folded upon each other to provide a substantially flat fan folded configuration of the hunter's blind for transporting or storage wherein the substantially flat fan folded configuration of the walls is placed in a bight formed in the removable top cover and/or the removable bottom pan, the top cover and/or the bottom pan folded in half about the flat fan folded configuration and wherein two side edges of the top cover and/or the bottom pan have a hand hold slot disposed therein for grasping by the hunter for transportation of the hunter's blind.

Another object of this invention is to provide a hunter's blind comprising rectilinear walls, a top cover, a bottom pan wherein the rectilinear walls are initially separate from each other and are joined at the contiguous edges thereof to provide for an upstanding rectilinear structure wherein the bottom pan and top cover each have means for detachably affixing the bottom pan and the top cover to the bottom ends and top ends respectively of the rectilinear walls.

BRIEF DESCRIPTION OF THE DRAWINGS

FIG. 3 is a plan view of the top cover of one embodiment of the hunter's blind of this invention shown laid out flat with the edge portions protruding therefrom, the bottom pan being substantially identical.

FIG. 4 is an end view of an alternate hunter's blind of this invention showing an alternate means for retaining the blind in a storage configuration.

FIG. 5 is a bottom view of an alternate top cover of the hunter's blind of this invention.

DESCRIPTION OF THE PREFERRED EMBODIMENTS

While the various features of this invention are hereinafter described and illustrated as a lightweight, collapsible, portable hunter's blind constructed of foam board, double walled plastic or card board panels which are secured together at at least one side edge of at least one of the panels in a rectilinear form with a removable top, an entry and at least one openable "window" for use by hunters in the field, it is to be understood that the various features of this invention can be used singly or in various combinations thereof for a collapsible, portable hunter's blind for use by hunters in the field as can hereinafter be appreciated from a reading of the following description.

Figure 1:
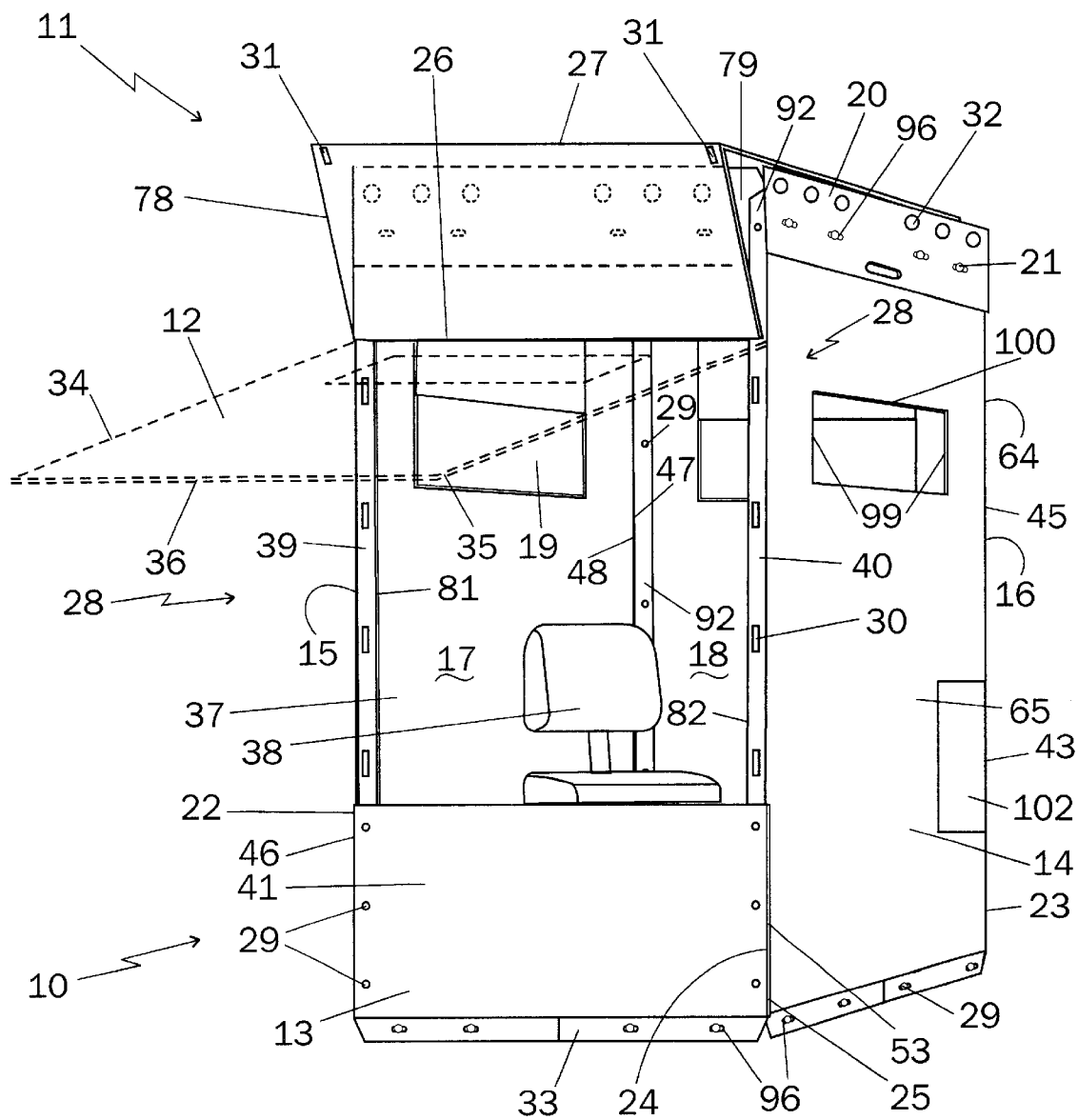
FIG. 1 is a perspective view of the preferred embodiment of the hunter's blind of this invention showing a means for ingress and egress extending from a frontispiece in dashed lines and folded over the top of the blind in solid lines.

Referring now to FIG. 1, a hunter's blind generally shown with the numeral 10 comprises rectilinear walls 13–16, a top cover 20, a bottom pan 33 and means 11 for ingress and egress. Means 11 for ingress & egress is preferably integral with front panel or frontispiece 13 and comprises an openable flap 12 larger than opening 37 in frontispiece 13. Openable flap 12 has its side edges 34, 35 adapted to overlie a portion of side flanges 39, 40 of adjacent sidewalls 15, 14 and bottom edge 36 to close against lip 93 of bottom portion 41 of frontispiece 13 respectively, wherein side edges 34, 35 are adapted to be detachably affixed to side flanges 39, 40 with means 28 for closing. Top cover 20 is adapted to be detachably secured to the upper end 42 of each rectilinear wall 13–16 with means 21 for detachably securing while bottom pan 33, when used, is adapted to be removably secured to lower end 44 of each wall 13–16 with separate means 29 for fastening. Each of means 28 for closing, means 21 for securing and means 29 for fastening will be fully described hereinafter. It is fully understood here, that the inventor hereof is not restricted to the right rectangular cubic structure as shown in the figures and as generally described herein and in fact, it is contemplated that blind 10 may comprise any number of sides closeable at the side edges thereof to form a cubic structure. For instance, a triangular base could be substituted for bottom pan 33 and a triangular top substituted for top cover 20 wherein three walls 13–15 would be joined together at the side edges thereof to form rectilinear walls capped by the triangular top and standing within the triangular base. Similarly, other structures having a different number of side walls may be constructed wherein top cover 20 and/or bottom cover 33 would have a similar number of side edges.

Figure 2:
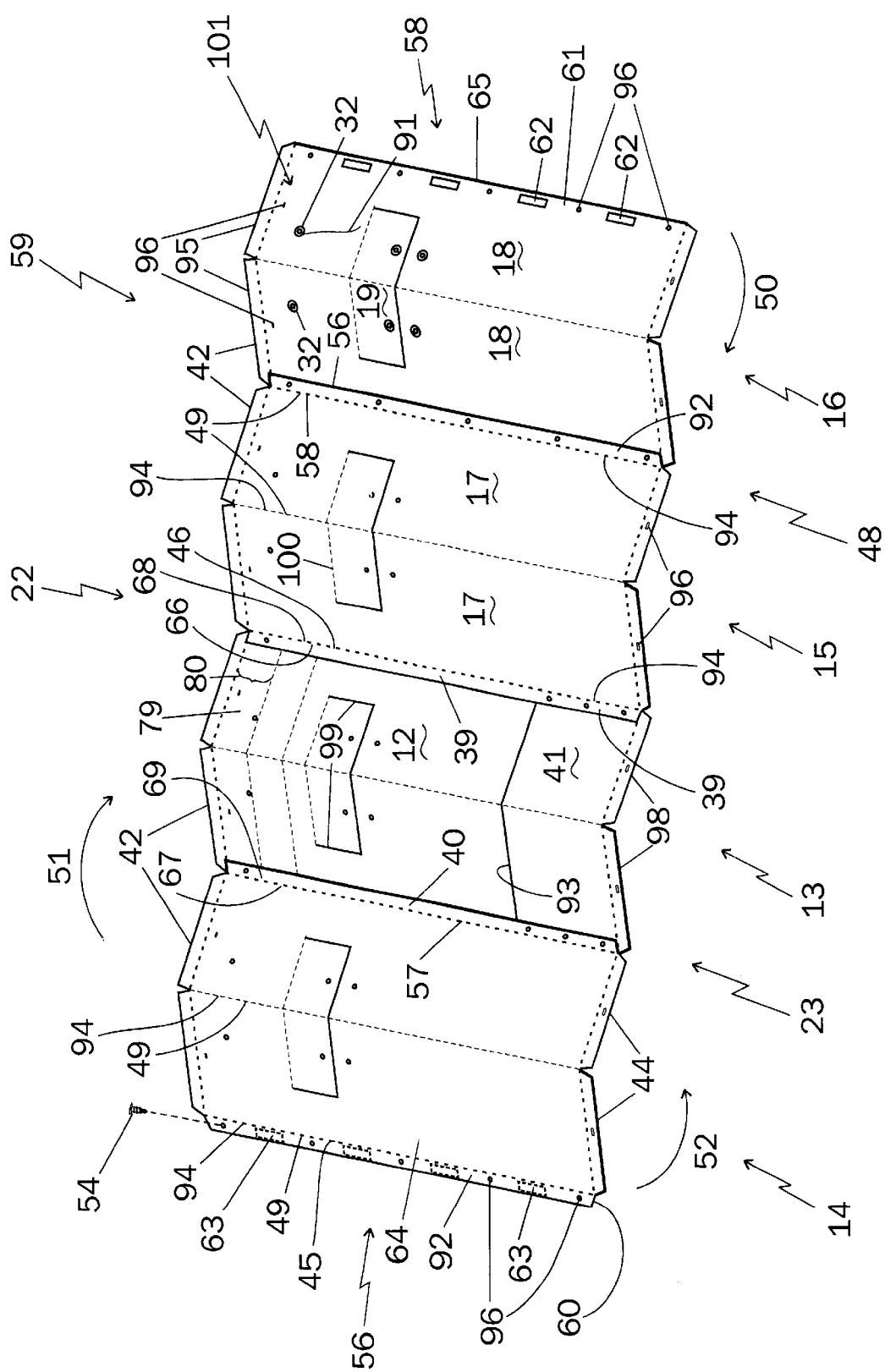
FIG. 2 is a perspective view of one embodiment of the hunter's blind of this invention partially folded for storage or transporting.

In the preferred embodiment shown in FIG. 1, rectilinear walls 14 and 16 are preferably joined at a corner 23 by a hinge member 43 such as a living hinge 45 wherein living hinge 45 is an integral part of at least one of walls 14, 16. As shown in FIG. 2, living hinge 45 is preferably formed between a flange 92 appended to wall 14 and wall 14 wherein flange 92 is thereafter adapted to be releasably secured to an open edge 65 of wall 16 at assembly of blind 10 as will be hereinafter fully explained. Living hinge 45 is generally formed as a crease 94 between wall 14 and flange 92 though a kerf 49 may be cut through at least one skin of the material used for blind 10. For instance, when using double walled plastic, thermoplastic corrugated board or corrugated cardboard to construct walls 13–16, living hinges 45–47 and 57 may be easily made by forming a crease 94 along one corrugation by folding a flange such as flange 92 of wall 14 upon wall 14 wherein the corrugation therebetween readily gives way. Alternately, or when using a solid board such as card board or foam board for walls 13–16, living hinges 45–47, 57 may be easily made by cutting through the outside surface skin of the material a distance substantially equal to the thickness thereof less the thickness of the inside surface skin. Thus, living hinges 45–47, 57 may be comprised of the inside skin of the foam board, corrugated cardboard or corrugated plastic board. A kerf 49 equal to the thickness of the material less the thickness of the skin may also be removed wherein the removal of kerf 49 is beneficial when it is desired to fold living hinge 45 in either direction as will be come hereinafter apparent. Alternately, hinge member 43 may be externally affixed to separate walls 13–16 after the formation thereof, wherein hinge member 43 becomes a part of walls 13–16. In this alternate, hinge member 43 as shown in FIG. 1 is disposed around corner 23 common to two adjacent ones, for example, 14 and 16 of walls 13–16 wherein hinge member 43 has separate tang portions 102 affixed to side edges 65, 64 of adjacent walls 14, 16 respectively though only one tang portion 102 of one hinge member 43 is shown on side edge 65 of wall 14. Alternate hinge member 43 as shown in FIG. 1 may be a plurality of hinge members 43 at corner 23 or may comprise a single hinge member extending substantially from lower end 44 to upper end 42. It is also contemplated that hinge member 43, when separately attached, may be a living hinge formed of a separate section of material similar to the material used for walls 13–16, but may be of another suitable material as well. In fact, it is well within the scope of this invention to use an elongated hinge such as a piano hinge for each hinge member 43.

In like manner to the formation of living hinge 45, a living hinge 46 is formed between walls 13 and 15 such that a portion of wall 13 may be fully folded upon a portion of inside surface 17 of wall 15 for storage, living hinge 46 preferably comprising a crease 94 in a corrugation in corner 22 between walls 13, 15 to facilitate folding wall 13 upon inside surface 17 of wall 15. In one embodiment, each wall 13–16 further has kerf 49 cut from or a crease 94 formed substantially in the center thereof such that each wall 13–16 may be additionally folded in half. Thus one half of each wall 13–16 is folded inwardly upon itself such that the outer surface of each half lays adjacent the outer surface of the other half and the other half of each wall 13–16 folded inwardly against the adjacent half of the adjacent wall 16–13 to produce a fan folded configuration 55 of blind 10 comprising eight thickness of walls 13–16 wherein walls 13–16 may be placed in a bight 88 formed in top cover 20 and/or bottom pan 33, top cover 20 and/or bottom pan 33 folded in half about flat fan folded configuration 55 and wherein two depending flanges 70, 85 of top cover 20 each have a hand hold slot 83, 84 respectively disposed therein for grasping by the hunter for transportation of hunter's blind 10. Hand hold slots 83, 84 are disposed in depending flanges 70, 85 at least a distance equal to one-half of the width of each wall plus at least one-half the width of bight 88 from bight 88, hand hold slots 83, 84 are unobstructed by walls 13–16 when fan folded configuration 55 is placed in bight 88 and thus the hunter may easily grasp hand hold slots 83, 84 on opposite sides of fan folded configuration 55 for ease of transport. Hand hold slots 83, 84 may alternately have a clasp associated therewith for holding the side halves 89, 90 of top cover 20 together about fan folded configuration 55 for storage of hunter's blind 10. Though depending flanges 70, 85 are generally greater in width than depending flanges 86, 87, all depending flanges 70, 85–87 may be the same width as is typical of bottom pan 33 as will hereinafter be explained. Each of depending flanges 70, 85–87 has means 21 for securing associated therewith for detachably securing top cover 20 to upper ends 42 of walls 13–16.

Corner 48 may have a crease 94 in a corrugation or a kerf 49 cut from inside surface 17 of wall 15 thus establishing a flange 92 appended to wall 14 and thereby establishing living hinge 47 between walls 15 and 16. In FIG. 2, each corner 22–23, 53, 48 is shown as having crease 94 provided in or kerf 49 cut from inside surfaces 17 of wall 15 or the corresponding inside surface of wall 14 at the juncture of each of rectilinear walls 13, 14, 15 and 16. Thus, rectilinear walls 13–16 may be fan folded into a substantially flat form 55 as is indicated in FIG. 2 by folding the respective walls according to the curved folding arrows 50–52 such that walls 13–16 may be easily transported or stored to produce the collapsed form of blind 10 as generally shown in FIG. 4, though the preferred blind 10 would have eight thickness of wall material surrounded by top cover 20 and/or bottom cover 33. As is apparent from FIG. 1, hunter's blind 10 comprising rectilinear walls 13–16, top cover 20 and bottom pan 33 may be readied for transportation or storage by removing top cover 20 from walls 13–16 by uncoupling means 21 for securing and lifting top cover 20 from the top edges 42 of walls 13–16 and bottom pan 33 may be separated from the rectilinear walls 13–16 by unfastening means 29 for fastening and lifting walls 13–16 therefrom. Thereafter, at least one rectilinear wall 13–16 is separated from an adjacent rectilinear wall 16–13 at the contiguous corner 22, 23, 48, 53 thereof and as shown in FIGS. 1 & 2, wall 16 is separated from wall 14 at corner 23 by uncoupling means 54 for joining and wherein rectilinear walls 13–16 are folded upon each other to provide a substantially flat fan folded configuration 55 of hunter's blind 10 for transporting or storage. Referring to FIG. 2, fan folded configuration 55 has a portion of inside surfaces 17 and 18 folded to face each other with another portion of inside surface 17 folded against a portion of front wall 13 each of the remaining portions of wall 13, 14 folded in like manner. However, as a crease 94 has been provided or a kerf 49 has been removed from each of corners 22, 23, 48 and 53, wall 13–16 could be folded opposite folding arrows 50–52 such that the outside surfaces of walls 13–16 are placed adjacent outside surfaces of adjacent walls 13–16.

In the one embodiment of FIG. 1, top cover 20 and bottom pan 33 are substantially the same in size, however, bottom pan 33 may be formed to fit within the interior confines of walls 13–16 while top cover 20 is adapted to fit over walls 13–16. Where bottom pan 33 is formed to fit within walls 13–16, bottom pan 33 would also nest readily within top cover 20 thus facilitating transport and storage of hunter's blind 10. In the preferred embodiment, top cover 20 has depending flanges 70, 85 extending from top portions 89, 90 respectively such that the total length of each half from bight 88 is at least equal in width to one half of any wall 13–16 such that hand holds 83, 84 are disposed above walls 13–16 when fan folded configuration 55 is placed in bight 88. The width of depending flanges 86, 87 may be equal to the width of depending flanges 70, 85 though depending flanges 86, 87 need only be sufficient in width to accommodate means 21 for securing. Top cover 20 may then be grasped along with fan folded configuration 55 wherein hunter's blind 10 may be readily transported.

In the preferred embodiment, side walls 14, 15 are each formed as an U-shaped channel, side wall 15 having flanges 39, 92 on the respective side edges thereof and sidewall 14 having flanges 40, 92 on the respective side edges thereof. Frontispiece 13 and back wall 16 are substantially flat panels having a width substantially equal to the width of blind 10 each being joined to flanges 39 and 40 on sidewalls 15, 14 respectively. Thus, openable flap 12 extends the entire width of frontispiece 13 and may readily be secured to side flanges 39, 40 with hook and loop fasteners 30, 31 as described herein. Lower portion 41 and upper portion 79 are secured to flanges 39, 40 with means 29 for fastening thus fixing frontispiece 13 to both of side walls 15, 14 respectively. Additionally, side wall 15 is joined to back wall 16 at corner 48 with means 29 for fastening wherein means 29 for fastening passes through aligned openings 96 disposed through both side wall flange 92 of side wall 14 and flat back wall 16. Preferably, means 29 for fastening are Quick Bind ratchet fasteners manufactured by Ark-Plas Products, Inc., of Flippin, Ark. though other semipermanent fasteners may be used to advantage as well. Finally, it is preferred that blind 10 be joined at assembly at corner 23 between walls 14 and 16 wherein means 54 for joining joins a flange 92 on side wall 14 to back wall 16, however, any other corner may be effectively used for final assembly. It is preferred that means 21 for detachably securing comprise rapid assembly type screw elements and it has been found by the teachings of this invention that hollow wall anchors described in U.S. Pat. No. 5,039,262, issued on Aug. 13, 1991 to Louis N. Giannuzzi entitled Self-Drilling Wall Anchor, have been particularly suitable.

In an alternate embodiment, top cover 20 and/or bottom pan 33 have depending flanges 70, 85–87 substantially equal in width to readily accommodate means 21 for securing and such that hand holds 83, 84 are disposed through windows 19 in each of walls 13–16 when fan folded configuration 55 is placed in bight 88. The hunter may then place fan folded configuration 55 within bight 88 of top cover 20 and/or bottom pan 33 with hand holds 83, 84 aligned in windows 19 wherein the assembly formed thereby may be tucked under the arm of the hunter with one folded edge of walls 13–16 adjacent the armpit and the opposite folded edge of walls 13–16 nested in bight 88.

Hunter's blind 10 is erected by unfolding walls 13–16 from flat fan folded configuration 55 opposite the direction indicated by arrows 50–52 and joined together at corner 23 with means 54 for joining thereby creating an open ended cubic structure as is apparent by referring to FIG. 1. Bottom ends 44 of the open ended cubic structure are then usually affixed to a base element and preferably bottom ends 44 are placed within bottom pan 33 and removably secured thereto with means 29 for fastening. Bottom ends 44, however, may be affixed to another base element such as a 3 foot by 3 foot pallet base by placing the pallet base on inwardly turned flanges of bottom ends 44 or bottom ends 44 may be affixed to the turf where blind 10 is erected by passing L-shaped anchor rods through at least one hole 96 in at least one inwardly turned flange of bottom ends 44 into the turf. After joining walls 13–16 into a cubic structure and affixing bottom ends 44 to one of the aforementioned base elements, top cover 20 is then hoisted above the cubic structure, placed upon the top edges 42 of walls 13–16 and detachably secured to walls 13–16 with means 21 for securing. Means 11 for ingress and egress may then be opened along side edges 34, 35 and lifted upwardly as shown with dashed lines in FIG. 1 wherein the user may then step over lower portion 41 through opening 37 and enter the interior confines of hunter's blind 10. A seating device such as chair 38 may be carried into the interior of hunter's blind 10 and be placed upon the base element such as bottom pan 33 for use by the user.

At least one, and preferably all walls 13–16 have a sight window disposed therethrough similar to sight window 19 disposed through wall 15. Sight window 19 is preferably disposed at a height above bottom pan 33 such that the user of blind 10 may readily observe the environment surrounding blind 10 while the user is in a seated position, however sight windows 19 may also be extended lengthwise along the vertical rise of walls 13–16 to provide for observation when the user is also in a standing position. Referring again to FIGS. 1 and 2, sight window 19 in frontispiece 13 is disposed through openable flap 12 such that hunter's blind 10 presents a substantially identical look when viewed toward each of the sides thereof as openable flap 12 is normally closed against frontispiece 13 when blind 10 is in use.

Preferably, walls 13–16 are each formed from a single sheet of corrugated thermoplastic board wherein walls 14 and 15 have flanges 39, 40, 92 appended to the side edges thereof A suitable thermoplastic board is known by the trademark Coroplast™, a member of the Jim Pattison Group of Vancouver, BC. Flanges 39, 40 and 92 are formed onto the side edges of walls 14, 15 by creasing a crease 94 from top end 42 to bottom end 44 approximately 2 inches inwardly from each edge. Walls 14 and 15 are also formed with a slight rake angle from one edge to the opposite edge such that top cover 20 of blind 10 is slightly canted with respect to bottom pan 33 to facilitate moisture runoff. Thus, walls 14, 15 may be initially cut in the same shape but having flanges 39, 92 of wall 14 formed in the opposite direction from flanges 40, 92 of wall 15. Likewise, inside surface 17 of wall 15 would be the same shape as outside surface of wall 14. Walls 13 and 16 are formed as flat walls having openings 96 formed through the marginal edges 66, 69 and 56, 65 respectively. Wall 13 is slightly longer than wall 16 to provide for the aforementioned cant of top cover 20 when top cover 20 is assembled onto walls 13–16. Top edges 42 of each of walls 13–16 are preferably short flange like sections 95 which are adapted to be bent inwardly provide some rigidity to walls 13–16 during assembly. Flange sections 95 are formed by skip-scoring through top end 42 of each of walls 13–16 such that flange sections 95 may be bent relative to walls 13–16 across the corrugations of the preferred corrugated thermoplastic board without buckling the respective wall. Skip-scoring may be described as a short slit through the entire thickness of walls 13–16 separated by an equally short uncut portion. In the preferred embodiment of FIGS. 1–3, each short slit in the skip-scoring is about one inch in length and thus each uncut portion is also about one inch. Skip-scoring is used throughout blind 10 to provide for a fold across the corrugations of a corrugated board at particular locations as will hereinafter be recited. For instance, bottom edges 44 are also skip-scored thus providing inwardly turnable flange portions 98. Flange portions 98 have openings 96 disposed therethrough for securing bottom pan 33 thereto or for affixing blind 10 to a more permanent base element with permanent fasteners or ground anchors.

Walls 13–16 may however, be formed from a single sheet of material 59 wherein kerf 49 is removed or a crease 94 is made from one side of the sheet of material 59 at locations along the width thereof aligned with the positions of corners 22, 23 and 48. On an edge 64 of sheet of material 59, a corner flange 92 is provided, corner flange 92 preferably attached to side wall 14. Corner flange 92 may also have a living hinge 45 between corner flange 92 and side wall 14 such that corner flange 92 may be folded inwardly behind rear wall 16 and be removably joined thereto. Open edge 65 is disposed on the opposite edge 58 of the sheet of material 59 opposite edge 56, and is adapted to receive corner flange 92 therebehind wherein corner flange 92 is secured to open edge 65 with means 54 for joining. Means 54 for joining preferably comprises the aforementioned hollow wall anchors, however, it has been found that hook and loop fastener sections along outside surface 60 of corner flange 92 and along inside surface 61 of open edge 65. Hook and loop fastener sections may span substantially the entire length of surfaces 60, 61 but hook fastener sections 62 may also be spaced along outside surface 60 and loop fastener sections 63 spaced along inside surface 61 aligned vertically thereon. Though hollow wall anchors are preferred for means 54 for joining, other means 54 for joining such as post and screw, post and binding, button and tie, magnetic strips, buttons, snaps, wing brads, ratchet assembly fasteners, arrow clip fasteners, dome and tack fasteners or any other fastener which may be used to removably secure elements together may be effectively utilized. If it is desired to permanently assembly hunter's blind 10, more permanent fasteners such as pop rivets may be utilized to join corner flange 25 to open edge 24 of wall 13, top cover 20 to upper ends 42 and/or bottom pan 33 to lower ends 44.

Referring to FIGS. 1–3, in the one embodiment shown therein, top cover 20 and bottom pan 33 are of the same size between their respective flanges and are therefore adapted to receive the top ends 42 and bottom ends 44 of rectilinear walls 13–16 therewithin such that top ends 42 of rectilinear walls 13–16 are contiguous with depending flanges 70, 85–87 surrounding top cover 20 and bottom ends 44 are contiguous with flanges 70 of bottom pan 33. Means 21 for detachably securing is provided for securing top cover 20 to top ends 42 wherein means 21 for securing preferably comprises a multiplicity of hollow wall anchors which are removably threaded into aligned openings 96 disposed through depending flanges 70, 85–87 of top cover 20 and top ends 42 of walls 13–16, however, means 21 for securing may comprise hook and loop fasteners similar to the hook portions 30 and loop portions 31 utilized on means 28 for closing. When hook and loop fasteners are utilized for securing top cover 20 to top ends 42, top ends 42 of walls 13–16 may be pressed outwardly after top cover 20 is hoisted above top ends 42 thereby securing the hook portions to the loop portions. It is also contemplated that means 21 for securing may comprise a combination of hook and loop fasteners, hollow wall anchors, ratchet assembly fasteners, post and screw fasteners, arrow clip fasteners, dome and tack fasteners or any other fastener which may be used to removably secure elements together. In a similar manner, bottom pan 33 may be detachably affixed to lower ends 44 of walls 13–16 with means 29 for fastening by disposing a fastener through aligned openings 96 through flanges 70 of side edges 76 of bottom pan 33 and bottom ends 44 of walls 13–16 and/or by pressing hook and loop fasteners on lower ends 44 and upstanding flange 76 of flanges 70. Of course, other means 21 for securing or means 29 for fastening may be employed as recited above.

Referring specifically to FIG. 3, top cover 20 is shown laid out flat with depending flanges 70, 85–87 extending outwardly from a substantially flat top portion 97. Top portion 97 comprises two sides 89, 90 separated by a bight 88, bight 88 adapted to receive fan folded configuration 55 therein. Bight 88 may have a kerf 49 cut through or a crease 94 disposed on either edge thereof to facilitate folding of top cover 20 thereat and each of depending flanges 70, 85–87 may have kerf 49 or crease 94 disposed along the contiguous edges with top portion 97, however, it is preferred that kerf 49 be comprised of a skip-score at least between flanges 86, 87 and top portion 97 as flanges 86, 87 are typically bent across the corrugations of the preferred corrugated thermoplastic board used for blind 10. Top portion 97 has inside surface 71 adapted to be rest upon top edges 42 of walls 13–16 when blind 10 is erected and similarly bottom pan 33 has an inside surface the same as inside surface 71 adapted for receiving bottom edges 44 thereon. Hand holds 83, 84 are disposed through depending flanges 70, 85 substantially in the center of the length thereof and also spaced from bight 88 a sufficient distance to allow for grasping of hand holds 83, 84 through windows 19, or above the fan folded configuration 55 when fan folded configuration 55 is nested in bight 88. Depending flanges 70, 85–87 have openings 96 disposed therethrough adapted for alignment with openings 96 in upper ends 42 of walls 13–16 for receiving means 21 for detachably securing top cover 20 to walls 13–16. It has been found by the inventor of this invention that four openings 96 in each depending flange 70, 85–87 is sufficient to retain top cover 20 upon walls 13–16.

Openable flap 12 of frontispiece 13 is generally larger than opening 37 such that edges 34 and 35 overlap side flanges 39 and 40 respectively. It should be fully appreciated here that opening 37 is defined as the opening between the inside edges 81, 82 of flanges 39, 40 respectively and thus is smaller than the overall width of blind 10 at frontispiece 13. Since frontispiece 13 is the full width of blind 10 and openable flap 12 is cut from one side edge 34, to other side edge 35 thereof, openable flap 12 is the same width as blind 10 at frontispiece 13 and is thus larger in width than opening 37. Flanges 39 and 40 and side edges 34, 35 have means 28 for closing affixed thereto wherein means 28 for closing preferably comprises hook and loop fasteners. One portion of the hook and loop fastener such as hook portion 30 is provided on flanges 39, 40 in short strips as shown. Preferably, the mating or loop portion 31 of the hook and loop fastener is provided on inside surface 78 of side edges 34, 35 aligned with hook portions 30 on flanges 39, 40. Thus openable flap 12 may be firmly affixed to flanges 39, 40 while blind 10 is in use or while blind 10 is being transported or stored. Openable flap 12 is primarily provided for ingress and egress from the interior of blind 10 however, openable flap 12 may be placed in a fully open position by folding flap 12 over top cover 20 as flap 12 has a living hinge 26 provided at a distance from top edge 42 of frontispiece 13 and another living hinge 27 spaced from hinge 26 at least equal to a length 80 that hinge 26 is spaced from top edge 42 of wall 13. Thus, flap 12 may be folded outwardly and upwardly along living hinges 26 and 27 such that the major part of flap 12 lays upon top cover 20 as shown in FIG. 1.

Windows 19 are preferably provided into each wall 13–16 of blind 10 by cutting through the entire thickness of each of walls 13–16 along three sides 99 of window 19 and providing a skip-score at the top edge 100 thereof thus providing a living hinge formed along edge 100 thereof wherein window 19 remains affixed to the respective wall 13–16 along edge 100. Discs 32 are removed from flanges 70, 85–87 of top cover 20 wherein these discs are secured to openings 96 through windows 19 and through each of walls 13–16 both below and above windows 19 such that window 19 has means 101 for holding window 19 in at least one position, wherein means 101 for holding comprises disc connectors 32, a binding twine 91 and means 29 for fastening on window 19 and the respective wall 13–16. Disc connectors 32 on window 19 have binding twine 91 affixed thereto for winding behind disc connectors 32 and around means 29 for fastening on the respective wall 13–16 to retain window 19 in at least one position, either opened or closed. Thus means 101 for holding provides a post and binding attachment for securing windows 19 in either an open condition as shown in one wall of FIG. 1 or in a closed position as should be readily apparent by referring to FIG. 2. It has been found by the teachings of this invention, that windows 19 when held in the open position may be used for the storage of shells or other objects as desired by the hunter.

In the simplest embodiment, hunter's blind 10 shown in FIG. 1 is converted from a display container for soft drinks generally found at convenience stores. Such display containers are typically made of thermoplastic corrugated board and comprise at least four walls and a cover from which walls 13–16 and top cover 20 of blind 10 are fashioned. Another top cover 20 is secured and inverted for use as bottom pan 33. The top cover of the container is removed and one of the corners of the walled structure is opened along its seam. Openings 96 are provided through the flange of the now opened seam to establish means 54 for joining. Openable flap 12 then has hook and loop fasteners affixed to marginal edges 34, 35 and flanges 39, 40 thereby establishing means 28 for closing. Additional openings 96 are provided in top cover 20, bottom pan 33, upper and lower ends 42, 44 respectively of walls 13–16 establishing means 21 for detachably securing. All surfaces of blind 10 are then painted with camouflage painting schemes in order that blind 10 may not be readily observed when in use in the field. Blind 10, when constructed of thermoplastic corrugated board provides adequate protection for the user thereof as the thermoplastic corrugated board repels moisture, is impervious to air flow and is light in weight for ready transport and erection. Of course, blind 10 may be constructed using other materials as recited above or blind 10 may be constructed according to one of the alternate embodiments listed below.

In an alternate embodiment shown in FIG. 4, hunter's blind 10 may comprise substantially identical rectilinear walls 13–16, top cover 20, bottom pan 33 wherein rectilinear walls 13–16 are initially separate from each other and are joined at the adjacent edges 56, 58, 64–69 thereof to provide for an upstanding rectilinear structure wherein bottom pan 33 and top cover 20 each have means 21 for detachably securing bottom pan 33 and top cover 20 to bottom ends 44 and top ends 42 respectively of rectilinear walls 13–16. One skilled in the art will appreciate that a corner flange is provided on one side edge 64–69 of each wall panel 13–16 such as corner flange 92 is shown appended to wall 14 in FIG. 2. Thus, wall 16 would be substantially the same as wall 14 having a corner flange at edge 56 to be received by wall 15 along an inside surface of edge 58. Similarly, walls 13 and 15 would have a corner flange similar to that of wall 14 along edges 69, 68 respectively to be received behind edges 67 of wall 14 and edge 66 of wall 13. As each corner flange would be similar to corner flange 92, hunter's blind 10 may be fully disassembled along these edges 56, 58, 64–69 or may be separated at only one pair of adjacent edges and fan folded as shown in FIG. 2. In this alternate embodiment, a means 11 for ingress & egress may be provided in at least one wall 13–16, but of course could be provided in each of walls 13–16. Adjacent edges 56, 58, 64–69 may be affixed together with means 54 for joining at each pair of adjacent edges as corner flange 25 is joined to open edge 24 in the preferred embodiment.

In an alternate embodiment of retaining blind 10 in a storage configuration as shown in FIG. 4, means 21 for detachably securing and means 29 for fastening comprise elongated strips 73 of hook and loop fastener materials depending from inside surface 71 of top cover 20 and extending above a similar surface comprising the inside surface of bottom pan 33. FIG. 4 shows separate walls 13–16, top cover 20 and bottom pan 33 of hunter's blind 10 in a storage or transporting mode wherein top cover 20 and bottom pan 33 are adapted to be detachably affixed to wall panels 13–16 with elongated hook and loop fasteners 73 as shown in dashed lines. Elongated strips 73 are generally loop type fasteners and mate with hook fasteners 62 on corner flanges 25 of wall panels 13–16 thus binding hunter's blind 10 into a compact package for ready transport or storage.

In yet another alternate embodiment as shown in FIG. 5, top cover 20 is formed by having at least a portion 74 of each corner 75 thereof wrap around a portion 77 of the side edge 76 thereof, portion 74 wrapping around portion 77 carrying at least a portion of a hook and loop fastener wherein the hook & loop fasteners are adapted to join corner 75 into a rectilinear pan like element wherein rectilinear pan like element is used as top cover 20. Bottom pan 33 may be formed in a similar manner. Thus, with this alternate embodiment of top cover 20 and/or bottom pan 33, hunter's blind 10 may be erected by first assembling walls 13–16 on the inside surface of bottom pan 33 and thereafter closing each corner 75 of bottom pan 33 around walls 13–16 and finally placing top cover 20 upon upper ends 42 of walls 13–16 and closing each corner 75 around walls 13–16.

In one of the alternate embodiments, openable flap 12 may be cut from wall 13 and thereby flap 12 fits into opening 37 wherein flap 12 may be secured to wall 13 by means 28 for closing comprising edge contacts such as magnets, hook and loop fasteners, button and tie fasteners, snaps and the like wherein these fasteners are attached to edges 34, 35 and inside edges 81, 82 of flanges 39, 40 respectively.

Alternate uses for blind 10 or a construction similar to blind 10 include a shelter for school children as they await the school bus, public transport passengers awaiting public transportation and security guards thereby providing protection from the elements to those using blind 10.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A hunter's blind comprises at least three upstanding walls, a top cover, a bottom pan and means for ingress and egress disposed through at least one of said walls, said walls provided with a crease substantially in the center thereof, wherein said walls are folded in half inwardly thus comprising a fan folded configuration, said top cover folded in half forming a bight between opposing halves of said top cover, said bottom pan folded in half and placed into said bight, said top cover and said bottom pan folded about said fan folded configuration, said top cover having two flanges extending above said fan folded configuration, each of said two flanges provided with a hand hold slot respectively disposed therethrough for grasping by the hunter for transportation of said hunter's blind.

2. A hunter's blind as in claim 1 wherein said means for ingress and egress comprises an opening cut through said at least one said wall.

3. A hunter's blind as in claim 2 said means for ingress and egress further comprises an openable flap having a width and a length at least as great as said opening in said wall.

4. A hunter's blind as in claim 3 wherein said openable flap has side edges adapted to overlie a portion of side flanges of said at least one said wall.

5. A hunter's blind as in claim 3 wherein said openable flap has a bottom edge adapted to overlie a portion of a bottom portion of said at least one said wall.

6. A hunter's blind as in claim 4 wherein said openable flap has means for closing associated with said side edges for detachably affixing said side edges to said side flanges.

7. A hunter's blind as in claim 5 wherein said openable flap has means for closing associated with said bottom edge for detachably affixing said bottom edge to said bottom flange.

8. A hunter's blind as in claim 1 wherein said top cover is detachably secured to an upper end of each of said walls.

9. A hunter's blind as in claim 1 wherein said bottom pan is detachably secured to a lower end of each of said walls.

10. A blind comprises at least three walls secured together with fasteners disposed through flanges formed along all the side edges thereof, said at least three walls joined together in a closed form, said at least three walls having top and bottom edges, said at least three walls further having a top overlying said upper ends of said walls, said at least three walls having a bottom pan detachably secured to said lower end thereof, at least one said wall having a means for ingress and egress disposed therethrough, said at least three walls further having a living hinge disposed substantially in the center thereof, said living hinge extending from said upper end to said lower end wherein said at least three walls may each be folded in half along said living hinge to facilitate transport of said blind.

* * * * *